(12) United States Patent
Koyama et al.

(10) Patent No.: US 7,454,995 B2
(45) Date of Patent: Nov. 25, 2008

(54) JOINT MECHANISM FOR ROBOT HAND AND THE LIKE

(75) Inventors: Junji Koyama, Nagano-ken (JP); Hiroshi Kameda, Nagano-ken (JP); Toshiaki Kamata, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 722 days.

(21) Appl. No.: 11/160,440

(22) Filed: Jun. 23, 2005

(65) Prior Publication Data
US 2006/0011009 A1 Jan. 19, 2006

(30) Foreign Application Priority Data
Jul. 16, 2004 (JP) .............................. 2004-209450

(51) Int. Cl.
*B25J 17/00* (2006.01)
*B25J 18/00* (2006.01)

(52) U.S. Cl. .................. 74/490.05; 901/23; 901/25; 901/28; 74/490.03

(58) Field of Classification Search ............... 74/490.05, 74/490.06, 490.01, 423, 417, 421 A; 901/23, 901/25, 26, 28, 29; 310/112
See application file for complete search history.

(56) References Cited

U.S. PATENT DOCUMENTS

| | | | | |
|---|---|---|---|---|
| 3,992,930 | A | * | 11/1976 | Back et al. .................. 324/391 |
| 4,662,814 | A | * | 5/1987 | Suzuki et al. ................ 414/730 |
| 5,043,617 | A | * | 8/1991 | Rostron ........................ 310/112 |
| 6,263,755 | B1 | * | 7/2001 | Perlin ........................ 74/490.01 |
| 6,658,962 | B1 | | 12/2003 | Rosheim |

FOREIGN PATENT DOCUMENTS

| EP | 0 322 670 A1 | 12/1988 |
|---|---|---|
| JP | 64-27880 | 1/1989 |
| JP | 2004-122339 | 4/2004 |
| JP | 2004-122339 A | 4/2004 |

OTHER PUBLICATIONS

European Search Report for Application No. EP 05 01 4849, dated Sep. 26, 2005.

\* cited by examiner

*Primary Examiner*—Richard W Ridley
*Assistant Examiner*—Justin Krause
(74) *Attorney, Agent, or Firm*—Buchanan Ingersoll & Rooney PC

(57) ABSTRACT

A joint mechanism that can be used in an articulated finger unit of a robot hand has first and second actuators that are disposed facing each other from the front and back on either side of a perpendicular joint axle, and first and second drive bevel gears that are coaxially connected and fixed to distal ends of output axles thereof. A driven bevel gear fixedly mounted in coaxial manner on the perpendicular joint axle meshes with the first and second drive bevel gears. The perpendicular joint axle is rotatably driven by the two actuators, and a revolving bracket connected thereto revolves to the left and right. The drive torque of the joint axle can be increased without increasing the outside diameter dimensions of the mechanism.

2 Claims, 4 Drawing Sheets

JOINT MECHANISM FOR ROBOT HAND AND THE LIKE

DESCRIPTION

1. Field of the Invention

The present invention relates to a joint mechanism used in a finger unit and the like of a robot hand that can accurately grasp airborne objects or the like at high speeds, and particularly relates to a joint mechanism wherein a drive torque of a joint axle can be increased without increasing outside diameter dimensions.

2. Description of the Related Art

Finger units used in robot hands commonly have articulated structures, and actuators that are small, lightweight, have high torque, and can drive finger joints with a high degree of precision are required in order to enable these articulated joint units to quickly and accurately grasp, hold, and throw objects. Configuring such an actuator requires a motor capable of instantaneously generating a maximum torque at high speeds within dimensions of the fingers, a reduction gear with minimal backlash at a high reduction ratio, and a precision encoder. However, such actuators are not commercially available, nor are related products that would serve as structural elements to satisfy such specifications. Specifically, the instantaneous maximum output torque of a servomotor is insufficient, a reduction gear has a large backlash of no less than 1° in an output axle even if it has multistage planetary gears, and no products that are sufficiently small and lightweight and have a high enough resolution for an encoder are available.

Also, in order to convert a rotation outputted from a rotational output axle of an actuator in an articulated finger unit into rotational movement of a joint axle orthogonal thereto, combinations of screws and locks/pinions, crank mechanisms, worm gears, wires, sheaves, and the like have been used in the prior art. However, all of these are inconvenient in that they increase the dimensions and mass of the joints, cause the speed of switching between operations to be insufficient, and bring about other problems. Using a regular bevel gear also has problems with the backlash and with smooth rotation.

In JP-A 2004-122339, the inventors et al. have proposed an articulated finger unit for a robot hand aimed at resolving such problems. FIGS. 3 and 4 are a plan view and a cross-sectional view showing the articulated finger unit disclosed in this literature. As shown in these diagrams, an articulated finger unit 1 has a mounting flange 2, an actuator 3 mounted on this mounting flange 2, and an articulated finger main body unit 5 connected to a rotational output axle 4 of the actuator 3. The finger main body unit 5 is configured from a finger-base joint part 6 connected to a front end of the rotational output axle 4 of the actuator 3, a finger base part 7 connected to a front end of the finger-base joint part 6, a fingertip joint part 8 connected to a distal end of the finger base part 7, and a fingertip part 9 connected to the front end of the fingertip joint part 8.

The pillar-shaped actuator 3 faces forward while a front end section thereof is fixed in place in a circular opening frame 2a of the mounting flange 2, and the rotational output axle 4 protrudes forward from a front end surface thereof through the circular opening frame 2a. A drive bevel gear 11 is coaxially fixed in place on a distal end of the rotational output axle 4.

A pair of finger-base side bearing housings 2b, 2c extend parallel to each other from top and bottom ends of a front surface of the mounting flange 2 through top and bottom positions of the drive bevel gear 11. A top ball bearing 12 and a bottom ball bearing 13 are respectively mounted so as to be in coaxial positions on distal ends of these finger-base side bearing housings 2b, 2c that protrude farther forward than the drive bevel gear 11. These ball bearings 12 and 13 allow a finger-base side joint axle 14 to be supported in a direction orthogonal, or perpendicular in the present example, to an axial direction of the rotational output axle 4, with top and bottom ends in a rotatable state.

A driven bevel gear 15 is coaxially fixed in place on an outer peripheral surface at the top of the joint axle 14 in the axial direction, and this driven bevel gear 15 meshes with the drive bevel gear 11. An annular boss 16a of a connecting member 16 is fixed in place in the middle of the axial direction of the joint axle 14. The connecting member 16 has the annular boss 16a, a neck portion 16b that extends forward from the annular boss 16a, and a fork portion 16c that extends forward in a shape of a U from a distal end of the neck portion 16b. A cylindrical base side cover 17 is connected coaxially to the fork portion 16c.

Thus, the finger-base joint part 6 linked to the front end of the rotational output axle 4 of the actuator 3 is configured from the top and bottom finger-base side bearing housings 2b, 2c formed on the mounting flange 2, the top and bottom ball bearings 12 and 13, the finger-base side joint axle 14, the finger-base side driven bevel gear 15, and the finger-base side connecting member 16. Also, the finger base part 7 is formed from the cylindrical base side cover 17 connected to the fork portion 16c of the finger-base side connecting member 16.

Next, the fingertip joint part 8 and the fingertip part 9 connected to the distal end of the finger base part 7 have the same structure as the finger-base side joint part 6 and the finger base part 7. Specifically, a second actuator 21 is coaxially mounted in the hollow part of the base side cover 17, and a front end of this actuator 21 is rotatably supported by an annular flange 22 mounted in the same manner in the hollow part of the base side cover 17. An outer peripheral surface of this annular flange 22 is fixed onto an inner peripheral surface of the base side cover 17.

A rotational output axle 23 of the actuator 21 protrudes coaxially forward through a hollow part of the annular flange 22, and a fingertip side drive bevel gear 24 is coaxially fixed in place on a distal end thereof. A pair of fingertip side bearing housings 22a, 22b extend parallel to each other from top and bottom ends of a front surface of the annular flange 22 through the top and bottom of the drive bevel gear 24. A top ball bearing 25 and a bottom ball bearing 26 are mounted on distal ends of the fingertip side bearing housings 22a, 22b that protrude farther forward than the drive bevel gear 24 so as to be in coaxial positions. These ball bearings 25 and 26 allow a fingertip side joint axle 27 to be supported in a direction orthogonal, or perpendicular in the present example, to an axial direction of the rotational output axle 23, with top and bottom ends in a rotatable state.

A driven bevel gear 28 is coaxially fixed in place on an outer peripheral surface at a top of the joint axle 27 in an axial direction, and this driven bevel gear 28 meshes with the drive bevel gear 24. An annular boss 29a of a fingertip side connecting member 29 is fixed in place in the middle of an axial direction of the driven bevel gear 28. The connecting member 29 has the annular boss 29a, a neck portion 29b that extends forward from the annular boss 29a, and a fork portion 29c that extends forward in a shape of a U from a distal end of the neck portion 29b. A cylindrical fingertip side cover 30 whose distal end is closed off in a semispherical shape is coaxially connected to the fork portion 29c.

In the articulated finger unit 1, the rotation of the rotational output axle 4 is converted to rotational movement in the joint axle 14 via the pair of bevel gears 11 and 15, and the connecting member 16 fixed in place at one end to the joint axle 14 revolves through an angle of 90° or more to the left and right around the joint axle 14. The joint parts 6 and 8 can be controlled to bend by an angle of 90° or more forwards and backwards or to the left and right, and a lightweight, fast and highly precise artificial finger that is capable of various operations can be achieved.

The actuators 3 and 21 have a servomotor with a high speed, high maximum torque, and short time rating based on a high-density winding and a high-density component arrangement; a wave gear drive unit with a high reduction ratio (for example, 1/50 to 1/100), small dimensions, high torque, and small backlash; and a small, lightweight, and highly responsive encoder with a high resolution. Also, oilless bevel gears with minimal backlash are used as the bevel gears 11, 15, 24, and 28. Such bevel gears are subjected to a surface hardening treatment after teeth are cut, a lapping treatment is performed using a high-precision bevel gear lapping machine in a backlash-free state, a tooth surface is impregnated with a solid lubricant, and the gears are made capable of backlash-free movement without lubrication.

This backlash-free movement structure of the bevel gears 11 and 15 and the bevel gears 24 and 28 used in the joint parts is comprised of spring plates. For example, in the finger-base side joint 6, spring plates 31 and 32 for applying an axial thrust that limits an amount of axial shift in the joint axle 14 in a direction of a conical center of the bevel gears are mounted on a top surface of the top ball bearing 12 and a bottom surface of the bottom ball bearing 13 on which the top and bottom ends of the joint axle 14 are rotatably supported. Spring plates 33 and 34 that function similarly are mounted in the same manner in the fingertip side joint part 8.

SUMMARY OF THE INVENTION

In a joint mechanism for a robot hand and the like as described above, it is common to use a higher size (model number) for a motor and a reduction gear constituting an actuator as a method for enhancing torque of joint axles. However, a motor and reduction gear of a higher model number normally also have larger outside diameter dimensions. Therefore, dimensions of the joint mechanism itself will inevitably be larger. Increasing the dimensions of the joint mechanism is not preferred because a diameter or thickness of the finger units of the robot hand incorporating these mechanisms will increase.

A main object of the present invention is to provide a joint mechanism for a robot hand and the like wherein a drive torque of a joint axle can be increased without increasing dimensions.

In order to achieve the above and other objects, a joint mechanism for a robot hand and the like according to the present invention has a joint axle, a supporting member for rotatably supporting the joint axle around a centerline thereof, a revolving member connected to the joint axle and allowed to revolve around the centerline along with the rotation of the joint axle, a first actuator mounted on the supporting member, a second actuator mounted on the revolving member, a driven bevel gear fixedly mounted in coaxial manner on the joint axle, a first drive bevel gear that is coaxially connected to a rotational output axle of the first actuator and that meshes with the driven bevel gear, and a second drive bevel gear that is coaxially connected to a rotational output axle of the second actuator and that meshes with the driven bevel gear.

In a typical configuration, the supporting member has a pair of support arms extending parallel to each other, and distal ends of these support arms rotatably support both end sections of the joint axle via bearings; the revolving member has a pair of connecting arms extending parallel to each other, and distal ends of these connecting arms are connected to sections farther out than the support arms in both end sections of the joint axle; and the driven bevel gear is fixedly mounted on a section of the joint axle at locations inside of the support arms.

In the joint mechanism for a robot hand and the like according to the present invention, the joint axle is rotatably driven using bevel gears, first and second actuators are disposed on either side of the joint axle, and rotational forces of both actuators can be transmitted to the joint axle via a gear train comprised of bevel gears. The drive torque of the joint axle can be increased by driving both actuators simultaneously.

Accordingly, unlike when an actuator comprised of a motor and a reduction gear with a higher model number is used, there are no negative results of increasing the outside diameter dimensions in order to increase the drive torque. Therefore, when the joint mechanism of the present invention is used, the drive torque can be increased without increasing the diameter or thickness of the finger units of the robot hand.

DESCRIPTION OF THE PREFERRED EMBODIMENTS

Examples of a joint mechanism for a robot hand and the like according to the present invention will be described with reference to the drawings.

Figure 1:
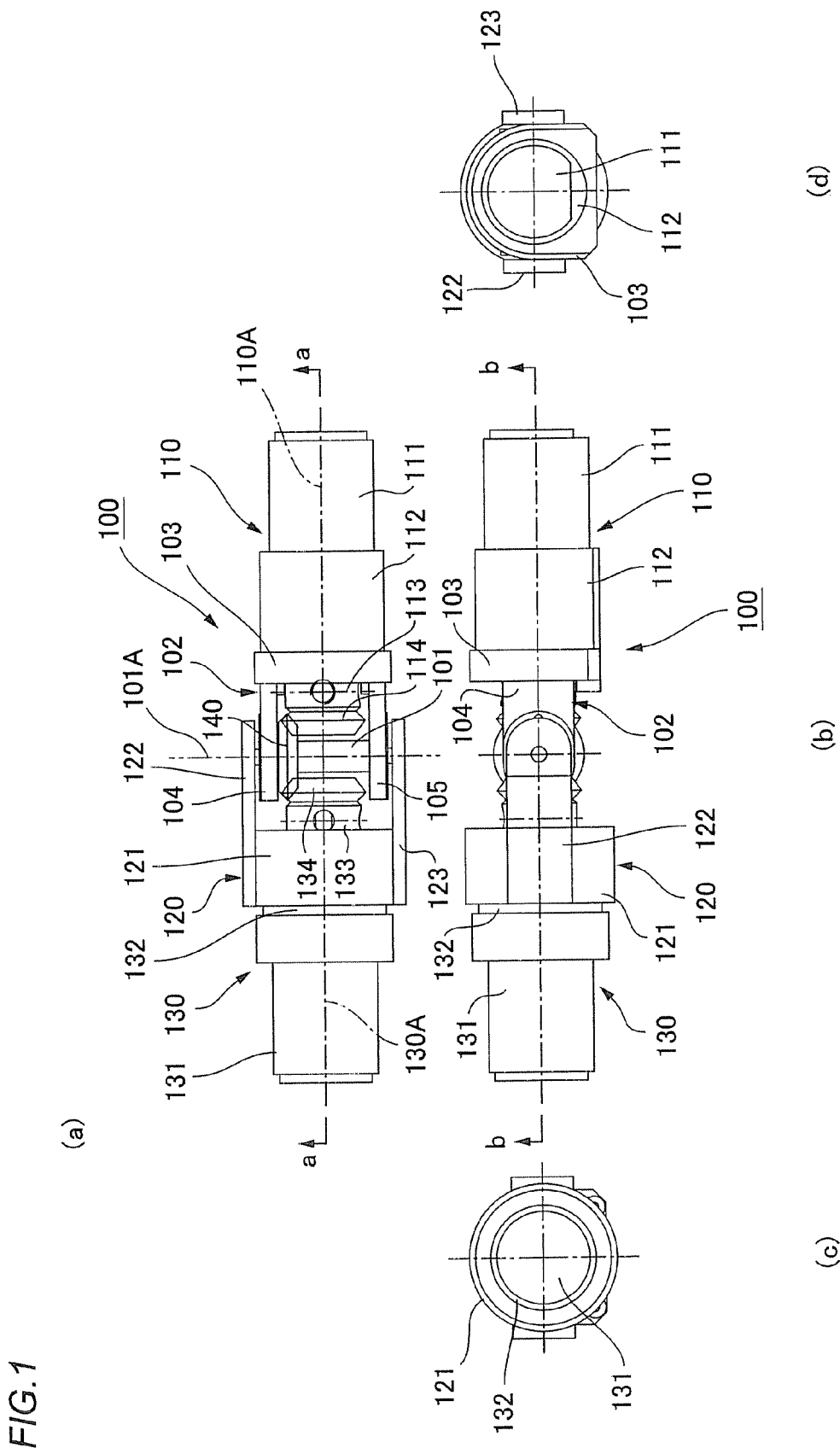
FIG. 1 is a front view, plan view, side view as seen from a distal end, and side view as seen from a rear side of a joint mechanism according to the present invention.
Figure 2:
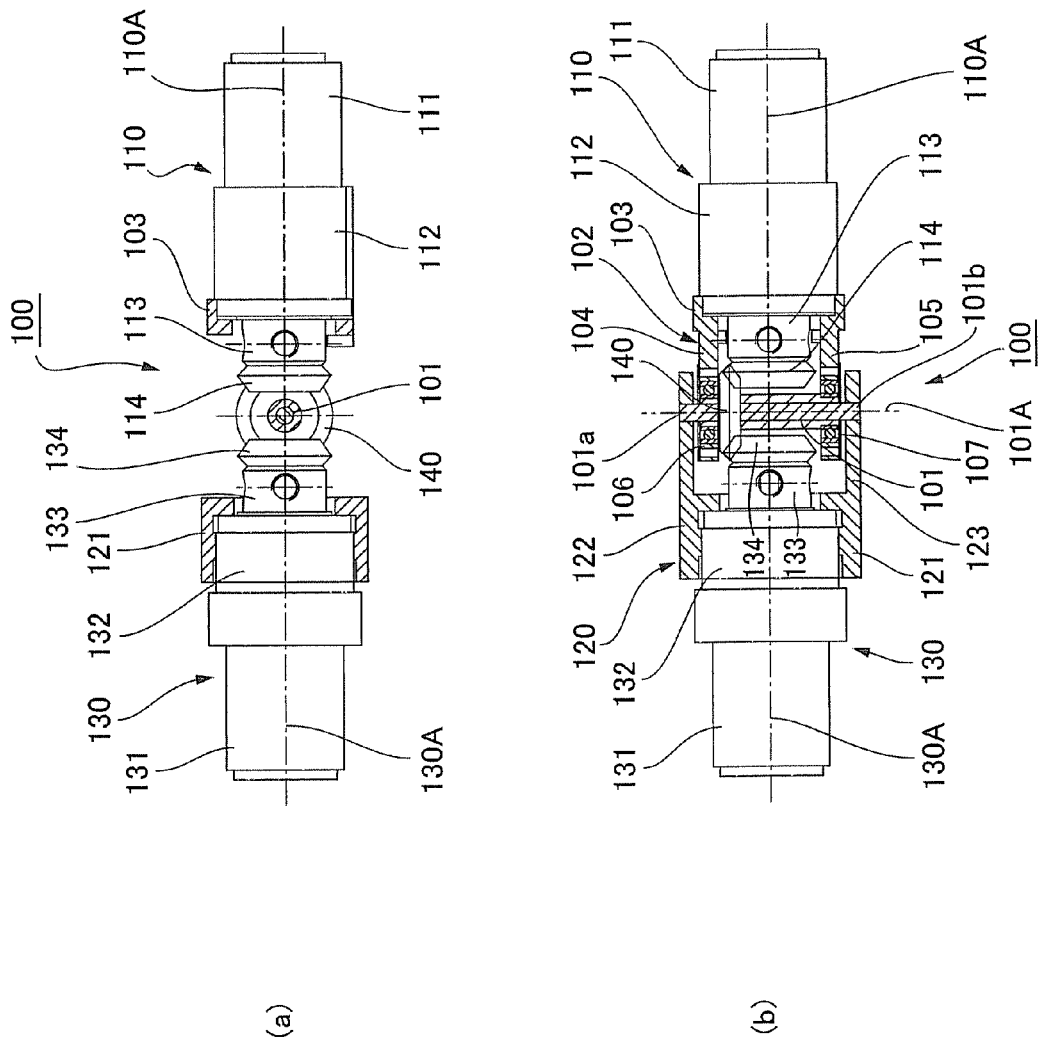
FIG. 2 is a cutaway view along a line a-a in FIG. 1, and a cutaway view along a line b-b in FIG. 1.

FIG. 1 is a front view, plan view, side view as seen from a distal end, and side view as seen from a rear side showing a joint mechanism of a finger unit of a robot hand. Also, FIG. 2 is a cutaway view along a line a-a in FIG. 1, and a cutaway view along a line b-b in FIG. 1.

A joint mechanism 100 of the present example has a pillar-shaped vertically extending perpendicular joint axle 101 that is rotatably supported by a supporting bracket 102. The supporting bracket 102 has an annular mounting frame 103 and a pair of top and bottom support arms 104 and 105 extending horizontally forward from top and bottom sections of the annular mounting frame 103. Bearings 106 and 107 are mounted horizontally on distal end sections of these support arms 104 and 105, and the perpendicular joint axle 101 is rotatably supported via these bearings 106 and 107. A front end section of a first actuator 110 is inserted, connected, and fixed in place in the annular mounting frame 103 of the supporting bracket 102 from a rear side.

Top and bottom end portions 101a and 101b of the perpendicular joint axle 101 protrude up and down from the bearings 106 and 107. A revolving bracket 120 positioned on a front side of the perpendicular joint axle 101 is connected and fixed in place in the end portions 101a and 101b. The revolving bracket 120 has an annular mounting frame 121 and a pair of top and bottom connecting arms 122 and 123 extending horizontally backward from top and bottom locations of the annular mounting frame 121. The top and bottom end portions 101a and 101b of the perpendicular joint axle 101 are press-fitted and fixed in place in axial holes formed in distal end portions of the connecting arms 122 and 123. Therefore, the revolving bracket 120 revolves to the left and right integrally with the rotation of the perpendicular joint axle 101 around a centerline 101A thereof. A front end section of a second actuator 130 disposed facing backward is inserted, connected, and fixed in place in the annular mounting frame 121 of the revolving bracket 120 from a rear side.

The first and second actuators 110 and 130 are disposed so that axis lines 110A and 130A thereof intersect in a center of a vertical direction of the centerline 101A of the perpendicular joint axle 101 and extend in an orthogonal direction from the centerline 101A. Specifically, the actuators are disposed so as to extend horizontally in forward and reverse directions. The first actuator 110 has a coaxially connected motor 111 and a reduction gear 112, a reducing rotational output axle 113 of the reduction gear 112 protrudes forward from the annular mounting frame 103 of the supporting bracket 102, and a first drive bevel gear 114 is coaxially connected and fixed in place on a distal end thereof. Similarly, the second actuator 130 has a coaxially connected motor 131 and a reduction gear 132, a reducing rotational output axle 133 of the reduction gear 132 protrudes backward from the annular mounting frame 121 of the revolving bracket 120, and a second drive bevel gear 134 is coaxially connected and fixed in place on a distal end thereof.

A driven bevel gear 140 is coaxially fixed in place at a bottom position of the top support arm 104 on the perpendicular joint axle 101 disposed between the first and second drive bevel gears 114 and 134 that face each other from the front and back. The front and back first and second drive bevel gears 114 and 134 both mesh with the driven bevel gear 140.

In the joint mechanism 100 with this configuration, the supporting bracket 102 is fixed in place, and when the first and second actuators 110 and 130 are rotatably driven in this state, the perpendicular joint axle 101 can be rotatably driven by the both actuators 110 and 130. When the perpendicular joint axle 101 rotates, the revolving bracket 120 and the second actuator 130 connected and fixed thereto revolve to the left and right from a neutral position of the drawing.

Figure 3:
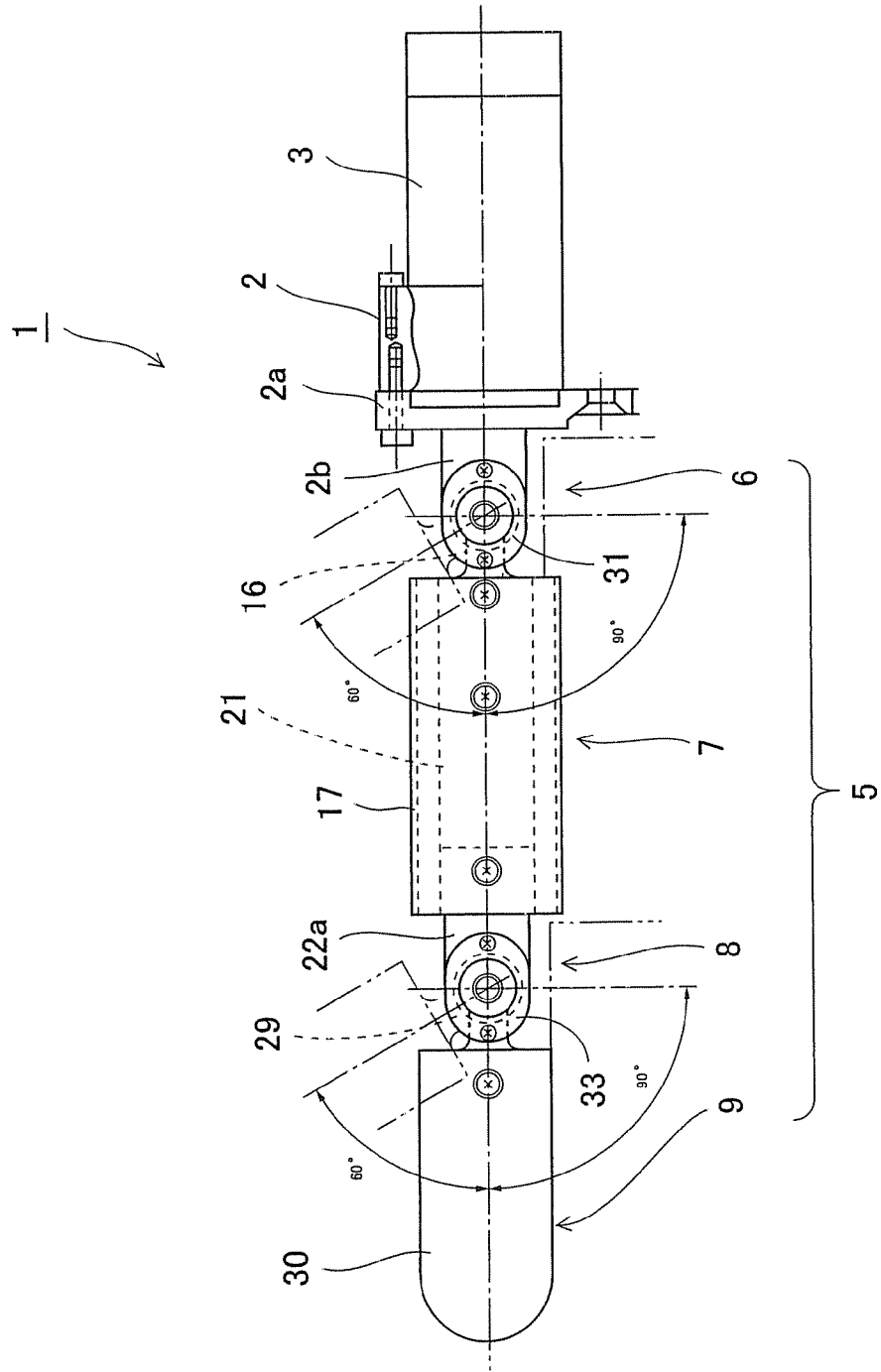
FIG. 3 is a plan view showing an example of an articulated finger unit.
Figure 4:
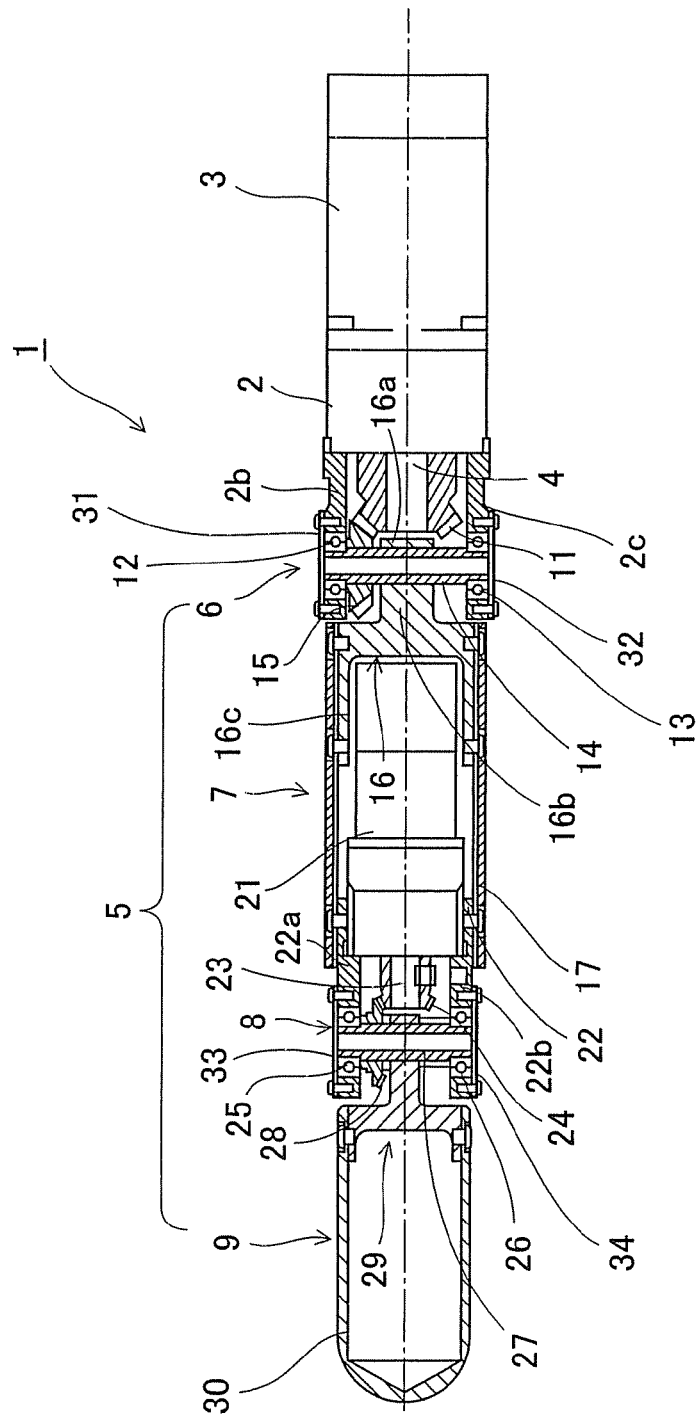
FIG. 4 is a longitudinal cross-sectional view of the articulated finger unit in FIG. 3.

The joint mechanism 100 of the present example can be applied, for example, to the fingertip joint part 8 in the finger unit 1 of the robot hand shown in FIGS. 3 and 4. In this case, the fingertip part 9 can be revolved by the two actuators 110 and 130. It is thereby possible to revolve the fingertip part 9 with essentially two times the drive torque as when the fingertip part 9 is revolved by a single actuator as shown in FIGS. 3 and 4, without increasing the outside diameter dimensions thereof. Also, it is possible to design the configuration such that the drive of the fingertip part 9 can be ensured by the other actuator when one of the actuators 110 and 130 fails.

It is apparent that the joint mechanism of the present invention can be used in a device other than the articulated finger unit with the structure shown in FIGS. 3 and 4.

What is claimed is:

1. A joint mechanism for a robot hand, comprising:
   a joint axle;
   a supporting member for rotatably supporting the joint axle around a centerline thereof;
   a revolving member connected to the joint axle and allowed to revolve around the centerline along with the rotation of the joint axle;
   a first actuator mounted on the supporting member;
   a second actuator mounted on the revolving member;
   a driven bevel gear fixedly mounted in coaxial manner on the joint axle;
   a first drive bevel gear that is coaxially connected to a rotational output axle of the first actuator and that meshes with the driven bevel gear; and
   a second drive bevel gear that is coaxially connected to a rotational output axle of the second actuator and that meshes with the driven bevel gear.

2. The joint mechanism for a robot hand according to claim 1, wherein
   the supporting member comprises a pair of support arms extending parallel to each other, and distal ends of the support arms rotatably support both end sections of the joint axle via bearings;
   the revolving member comprises a pair of connecting arms extending parallel to each other, and the distal ends of the connecting arms are connected to sections farther out than the support arms at both end sections of the joint axle; and
   the driven bevel gear is fixedly mounted on a section of the joint axle at locations inside of the support arms.

* * * * *